US012217669B2

(12) United States Patent
Huang et al.

(10) Patent No.: US 12,217,669 B2
(45) Date of Patent: Feb. 4, 2025

(54) PIXEL DRIVING CIRCUIT, DRIVING METHOD THEREOF, AND DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventors: Shiqiang Huang, Hubei (CN); Qi Cao, Hubei (CN); Zhengyue Chen, Hubei (CN); Xing Ming, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 703 days.

(21) Appl. No.: 16/975,121

(22) PCT Filed: Jun. 15, 2020

(86) PCT No.: PCT/CN2020/096126

§ 371 (c)(1),
(2) Date: Aug. 22, 2020

(87) PCT Pub. No.: WO2021/217808

PCT Pub. Date: Nov. 4, 2021

(65) Prior Publication Data

US 2023/0123397 A1 Apr. 20, 2023

(30) Foreign Application Priority Data

Apr. 29, 2020 (CN) ......................... 202010356383.1

(51) Int. Cl.
*G09G 3/3233* (2016.01)
*G09G 3/3266* (2016.01)
*G09G 3/3291* (2016.01)

(52) U.S. Cl.
CPC ......... *G09G 3/3233* (2013.01); *G09G 3/3266* (2013.01); *G09G 3/3291* (2013.01); *G09G 2300/0819* (2013.01)

(58) Field of Classification Search
CPC .. G09G 3/3233; G09G 3/3266; G09G 3/3291; G09G 2300/0819
See application file for complete search history.

(56) References Cited

U.S. PATENT DOCUMENTS 9,589,502 B2 3/2017 Hong et al.
10,004,124 B1 * 6/2018 Ko ....................... G09G 3/3233
(Continued)

FOREIGN PATENT DOCUMENTS

CN 103985352 A 8/2014
CN 106558287 A 4/2017
(Continued)

*Primary Examiner* — Stacy Khoo

(57) ABSTRACT

The present disclosure provides a pixel driving circuit, a driving method thereof, and a display device. The pixel driving circuit includes a compensation unit, the compensation unit and a driving unit are coupled to a second node, and the compensation unit is connected to a first scanning signal; a light-emitting control unit is configured to receive a light-emitting signal, and the light-emitting control unit, the driving unit, and the compensation unit are coupled to a third node.

4 Claims, 5 Drawing Sheets

(56) References Cited

U.S. PATENT DOCUMENTS

| | | | |
|---|---|---|---|
| 2014/0146029 A1 | 5/2014 | Hong et al. | |
| 2015/0348462 A1 | 12/2015 | Ma | |
| 2017/0301293 A1 | 10/2017 | Zhu et al. | |
| 2020/0098316 A1 | 3/2020 | Yokoyama et al. | |
| 2020/0335046 A1* | 10/2020 | Ryu | G09G 3/3233 |

FOREIGN PATENT DOCUMENTS

| | | |
|---|---|---|
| CN | 109087610 A | 12/2018 |
| CN | 110085170 A | 8/2019 |
| CN | 110895915 A | 3/2020 |

* cited by examiner

PIXEL DRIVING CIRCUIT, DRIVING METHOD THEREOF, AND DISPLAY DEVICE

FIELD OF INVENTION

The present disclosure relates to the field of display technology, and more particularly, to a pixel driving circuit, a driving method thereof, and a display device.

BACKGROUND OF INVENTION

Pixels in organic light-emitting diode display panels are driven by changing a gate voltage of a driving transistor to control a current between a source and drain of the driving transistor. Different currents realize a change of light-emitting brightness of the pixels, which thereby display different gray scales.

However, during a panel production process, due to factors such as process uniformity and volatility, a threshold voltage (Vth) of the driving transistors at different positions in a plane will be different, and as a working time of organic light-emitting diode device increases and a working environment changes, the threshold voltage of the driving transistors will also drift. The threshold voltages of the driving transistors at different positions in the plane are different, which will cause differences in their driving currents, and therefore result in uneven display.

SUMMARY OF INVENTION

The object of the present disclosure is to provide a pixel driving circuit, a driving method thereof, and a display device, which can avoid display unevenness and improve the display effect.

To solve the above technical problems, the present disclosure provides a pixel driving circuit, comprising:

- a data writing unit connected to a data voltage and a first scan signal and configured to write the data voltage to a first node during a reset phase;
- a first control unit connected to a first power supply voltage and a second scan signal, coupled to the first node with a driving unit and the data writing unit respectively, and configured to write the first power supply voltage to the first node during a light-emitting phase;
- the driving unit connected to the first power supply voltage and configured to provide a driving current;
- a compensation unit coupled to a second node with the driving unit and connected to the first scan signal, wherein the data writing unit and the compensation unit are configured to charge the second node to a first compensation voltage during a compensation phase;
- a light-emitting control unit configured to receive a light-emitting signal, coupled to a third node with the driving unit and the compensation unit, and configured to reset a light-emitting device and to control the driving current to transmit to the light-emitting device during the light-emitting phase; and
- the light-emitting device, wherein a first electrode of the light-emitting device is connected to the light-emitting control unit, and a second electrode of the light-emitting device is configured to receive a second power supply voltage.

The present disclosure provides a display device, including a display panel, which includes the above-mentioned pixel driving circuit.

The present disclosure provides a pixel driving method based on the above pixel driving circuit, and the pixel driving method including:

- in a reset phase, writing a data voltage to a first node in response to control of a first scan signal by a data writing unit and pulling down a voltage of a second node by a compensation unit and a light-emitting control unit;
- in a compensation phase, charging the voltage of the second node to a first compensation voltage in response to the control of the first scan signal by both the data writing unit and the compensation unit;
- wherein V1=Vdata+Vth, V1 represents the first compensation voltage, Vdata represents the data voltage, and Vth represents a threshold voltage of a driving transistor; and
- in a light-emitting phase, inputting a first power supply voltage to the first node in response to control of a second scan signal by a first control unit;
- wherein a driving unit outputs a driving current to a light-emitting device through the light-emitting control unit in response to control of the voltage of the second node to drive the light-emitting device to emit light.

The pixel driving circuit, the pixel driving method thereof, and the display device of the present disclosure improve the currently pixel driving circuit, so that the current flowing through the light-emitting device is independent of the threshold voltage of the driving transistor, achieving compensation of the threshold voltage of the driving transistor to prevent uneven display, and thereby improving the display effect.

DETAILED DESCRIPTION OF PREFERRED EMBODIMENTS

Figure 1:
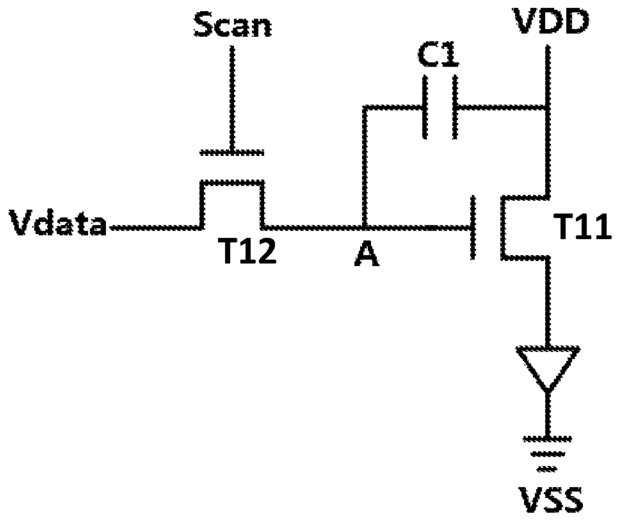
FIG. 1 is a schematic diagram of a structure of a currently first pixel driving circuit.

The description of the following embodiments refers to the attached figures to illustrate specific embodiments that the present disclosure can be implemented. The directional terms mentioned in the present disclosure, such as "up", "down", "front", "rear", "left", "right", "inner", "outer", "side", etc., are only for reference the direction of the attached figures. Therefore, the directional terms are used to describe and understand the present disclosure, rather than to limit the present disclosure. In the figure, units with similar structures are indicated by the same reference numerals.

Figure 2:
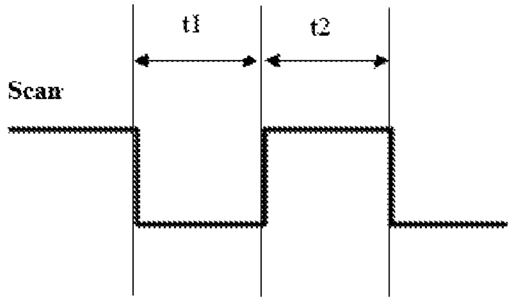
FIG. 2 is a schematic diagram of a working sequence of the pixel driving circuit shown in FIG. 1.

As shown in FIG. 1 and FIG. 2, a currently 2T1C pixel driving circuit includes a driving transistor T11 and a second transistor T12. A gate of the second transistor T12 is connected to a scan signal Scan, a source of the second transistor is connected to a data voltage Vdata, a gate of the driving transistor T11 is connected to a drain of the second transistor T12, and the source of the second transistor is connected to a first power supply voltage VDD (DC voltage). A specific working process includes following phases:

Taking T12 and T11 as P-type transistors for example, in a signal writing phase (t1): the scan signal Scan outputs a low level, the transistor T12 is turned on, the data signal Vdata is written to point A through the transistor T12, and an electrical potential of point A becomes Vdata, that is, a gate electrical potential of the driving transistor T11 is Vdata, which is stored in the capacitor C1;

In a light-emitting phase (t2): The scan signal Scan outputs a high level, the transistor T12 is turned off, and the DC voltage VDD continuously charges the driving transistor T11 and forms a current to drive the OLED device to emit light. The current flowing through an anode of the OLED device (a saturation current of T11) is proportional to a square of a difference between the gate-source voltage of the driving transistor T11 and a threshold voltage of the driving transistor T11. The current formula is as follows:

$$I - \frac{1}{2}uC\frac{W}{L}(Vgs - Vth)^2 - \frac{1}{2}uC\frac{W}{L}(Vdata - VDD - Vth)^2$$

Wherein, u is a channel carrier mobility of the driving transistor T11, C is a channel capacitance per unit area, W is a channel width of the driving transistor T11, L is a channel length of the driving transistor T11, and Vth is a threshold voltage of the driving transistor T11. It can be seen that the current flowing through the light-emitting diode is related to the threshold voltage of the driving transistor T11.

Figure 3:
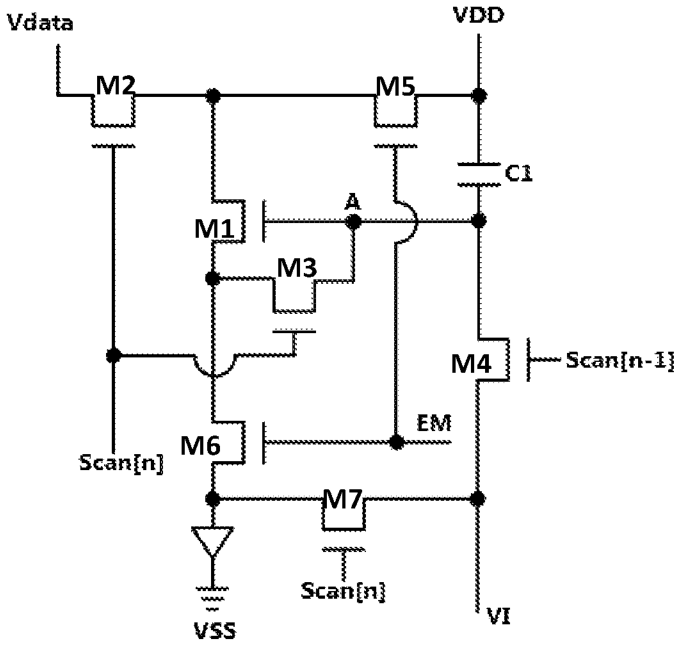
FIG. 3 is a schematic diagram of a structure of a currently second pixel driving circuit.
Figure 4:
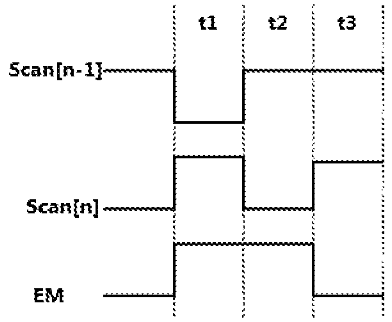
FIG. 4 is a schematic diagram of a working sequence of the pixel driving circuit shown in FIG. 3.

As shown in FIG. 3 and FIG. 4, a currently 7T1C pixel driving circuit includes a driving transistor M1 and a second transistor M2 to a seventh transistor M7.

A gate of the second transistor M2 is connected to a second scan signal Scan[n], a source the second transistor M2 is connected to the data voltage Vdata, and a drain of the second transistor M2 is connected to a source of the driving transistor M1,

- a gate of the driving transistor M1 is connected to a first node A, and a drain of the driving transistor M1 is connected to a drain of the third transistor M3;
- a gate of the fifth transistor M5 is connected to a light-emitting signal EM, a source of the fifth transistor M5 is connected to a data voltage VDD, and a drain of the fifth transistor M5 is connected to the source of the driving transistor M1;
- a gate of the third transistor M3 is connected to the second scan signal Scan[n], a source of the third transistor M3 is connected to the first node A, and the drain of the third transistor M3 is connected to the drain of the driving transistor M1,
- a gate of the fourth transistor M4 is connected to a first scan signal Scan[n−1], a source of the fourth transistor M4 is connected to the first node A, and a drain of the fourth transistor M4 and a source of the seventh transistor M7 are both connected to a low-level signal VI;
- a gate of the sixth transistor M6 is connected to the light-emitting signal EM, a source of the sixth transistor M6 is connected to the drain of the driving transistor M1, a drain of the sixth transistor M6 is connected to a drain of the seventh transistor M7 and a light-emitting device, and a gate of the seventh transistor M7 is connected to the second scan signal Scan[n].

The specific work process includes the following phases:

The working process of the pixel driving circuit is divided into three phases: initialization phase (t1), threshold voltage compensation phase (t2), and light-emitting phase (t3), as follows:

Taking M1 to M7 as P-type transistors for example, in the initialization phase (t1): Scan[n−1] outputs the low level to turn on the transistor M4, Scan[n] and EM output the high level to turn off M2, M3, M5, M6, and M7, and VI signal (low electrical potential) resets a gate of driving transistor M1 (point A) through M4;

In the threshold voltage compensation phase (t2): Scan [n−1] and EM output the high level to turn off transistors M4, M5, and M6, Scan[n] outputs the low level to turn on M2, M3, and M7, in the previous phase, the gate of M1 is at the low potential, M1 is in the on state, and the data voltage Vdata charges point A (gate of M1) through M2, M1, and M3. M1 doesn't meet a turn-on condition when an electrical potential difference between the gate of M1 and the source of M1 is its threshold voltage (ie VA−Vdata=Vth), and the threshold voltage compensation phase ends. At this time, a potential of point A is: Vdata+Vth, and the VI signal resets an anode of the light-emitting device through M7.

In the light-emitting phase (t3): Scan[n−1] and Scan[n] output the high level to turn off transistors M2, M3, M4, and M7, EM outputs the low level to turn on M5 and M6, VDD supplies power to the anode of the light-emitting device through M5, M1, and M6, and the driving transistor M1 outputs current to drive the light-emitting device to emit light.

A saturation current formula of the driving transistor M1 is as follows, the current flowing through the anode of the OLED device is independent of Vth, and achieve compensation of the threshold voltage of M1.

$$I = \frac{1}{2}uC\frac{W}{L}(Vgs - Vth)^2 = \frac{1}{2}uC\frac{W}{L}(Vdata + Vth - VDD - Vth)^2 = \frac{1}{2}uC\frac{W}{L}(Vdata - VDD)^2$$

Although the 7T1C compensation circuit can prevent the current flowing through the anode of the OLED from being independent of the threshold voltage of M1, there is a relatively greater number of transistors and the input voltage signals occupying a relatively large layout area, which is not conducive to saving wiring space, so it is difficult to achieve high resolution.

Figure 5:
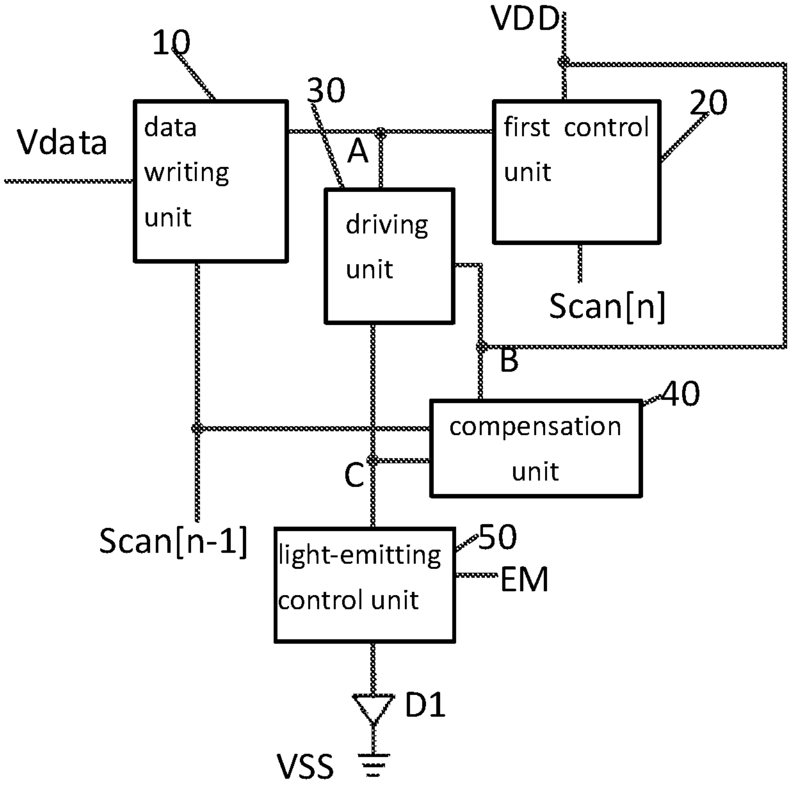
FIG. 5 is a schematic structural diagram of a pixel driving circuit according to embodiment 1 of the present disclosure.

Please refer to FIG. 5, FIG. 5 is a schematic structural diagram of a pixel driving circuit according to embodiment 1 of the present disclosure.

As shown in FIG. 5, the pixel driving circuit of this embodiment includes a data writing unit 10, a first control unit 20, a driving unit 30, a compensation unit 40, a light-emitting control unit 50, and a light-emitting device D1.

The data writing unit 10 is connected to a data voltage Vdata and a first scan signal Scan[n−1]; and the data writing unit 10 is configured to write the data voltage Vdata to a first node A during a reset phase;

the first control unit 20 is connected to a first power supply voltage VDD and a second scan signal Scan[n], and coupled to the first node A with a driving unit 30 and the data writing unit 10 respectively, and configured to write the first power supply voltage VDD to the first node A during a light-emitting phase.

The driving unit 30 is connected to the first power supply voltage VDD; the driving unit 30 is configured to provide a driving current; the driving current is configured to drive the light-emitting device D1 to emit light.

The compensation unit 40 is coupled to a second node B with the driving unit 30, and connected to the first scan signal Scan[n−1]; the data writing unit 10 and the compensation unit 40 is configured to charge the second node B to a first compensation voltage V1 in the compensation phase;

the light-emitting control unit 50 is configured to receive a light-emitting signal EM, coupled to a third node C with the driving unit 30 and the compensation unit 40, and configured to reset the light-emitting device D1 and to control the driving current to transmit to the light-emitting device D1 during the light-emitting phase;

a first electrode of the light-emitting device D1 is connected to the light-emitting control unit 50, and a second electrode of the light-emitting device D1 receives the second power supply voltage VSS. In one embodiment, a first power supply voltage VDD is greater than a second power supply voltage VSS, and the first electrode is an anode and the second electrode is a cathode. The light-emitting device may be an organic light-emitting diode.

The working process of the pixel driving circuit of this embodiment includes the following three phases:

In a reset phase, writing the data voltage Vdata to the first node A by the data writing unit 10; pulling down a voltage of the second node B by the compensation unit 40 and the light-emitting control unit 50. A potential written into the second node B in the previous frame is Vdata+Vth, and a potential at point A is Vdata at this time.

In a compensation phase, charging a voltage of the second node B to a first compensation voltage V1 by both the data writing unit 10 and the compensation unit 40; wherein V1=Vdata+Vth, and V1 represents the first compensation voltage, Vdata is the data voltage, and Vth is the threshold voltage of the driving transistor; T1 turned off when the voltage at point B meets VA−Vdata=Vth, and the threshold voltage compensation phase ends when the potential at point B meets Vdata+Vth.

In a light-emitting phase, inputting the first power supply voltage VDD to the first node A by the first control unit 20; the driving unit 30 outputs a driving current to the light-emitting device D1 through the light-emitting control unit 50 to drive the light-emitting device D1 emitting light.

Figure 6:
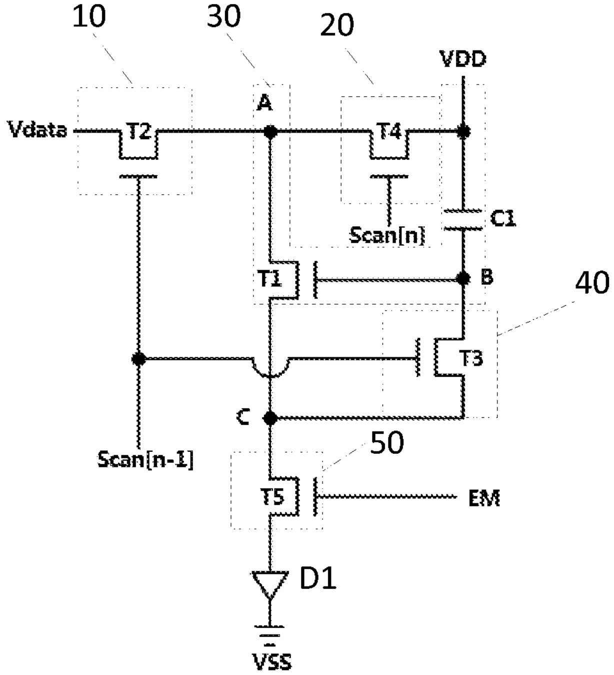
FIG. 6 is a schematic structural diagram of a pixel driving circuit according to a second embodiment of the present disclosure.

Please refer to FIG. 6, FIG. 6 is a schematic structural diagram of a pixel driving circuit according to a second embodiment of the present disclosure.

As shown in FIG. 6, the first control unit 20 includes a fourth transistor T4, a gate of the fourth transistor T4 is connected to the second scan signal Scan[n], a drain of the fourth transistor T4 is connected to the first node A, and a source of the fourth transistor T4 is connected to the first power supply voltage VDD.

The driving unit 30 includes a driving transistor T1 and a first capacitor C1, a gate of the driving transistor T1 is connected to the second node B, and a source of the driving transistor T1 is respectively connected to the first node A and the drain of the fourth transistor T4;

one terminal of the first capacitor C1 is connected to the first power supply voltage VDD, and the other terminal of the first capacitor C1 is connected to the second node B.

The compensation unit 40 includes a third transistor T3, a gate of the third transistor T3 is configured to receive the first scan signal Scan[n−1], a source of the third transistor T3 and a gate of the driving transistor T1 are connected to the other terminal of the first capacitor C1, and a drain of the third transistor T3 is connected to the third node C.

The light-emitting control unit 50 includes a fifth transistor T5, a gate of the fifth transistor T5 is connected to the light-emitting signal EM, a source of the fifth transistor T5 is respectively connected to the drain of the third transistor T3 and a drain of the driving transistor T1, and a drain of the fifth transistor T5 is connected to the second power supply voltage VSS.

The data writing unit 10 includes a second transistor T2, a gate of the second transistor T2 is connected to the first scan signal Scan[n−1], a source of the second transistor T2 is connected to the data voltage Vdata, and a drain of the second transistor T2 is connected to the source of the driving transistor T1.

All transistors in the pixel driving circuit are N-type transistors; or, all transistors in the pixel driving circuit are P-type transistors.

Figure 7:
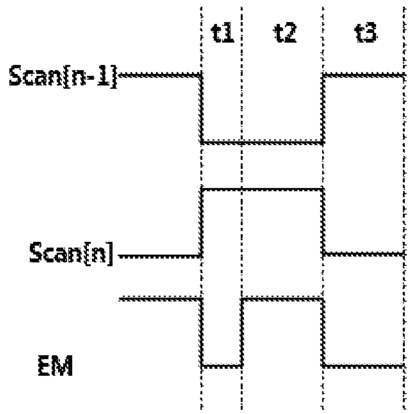
FIG. 7 is a schematic diagram of a working sequence of the pixel driving circuit shown in FIG. 6.

Taking all the transistors as P-type transistors for example, the working process of the pixel driving circuit of this embodiment will be described in detail with reference to FIG. 6 and FIG. 7.

Figure 8:
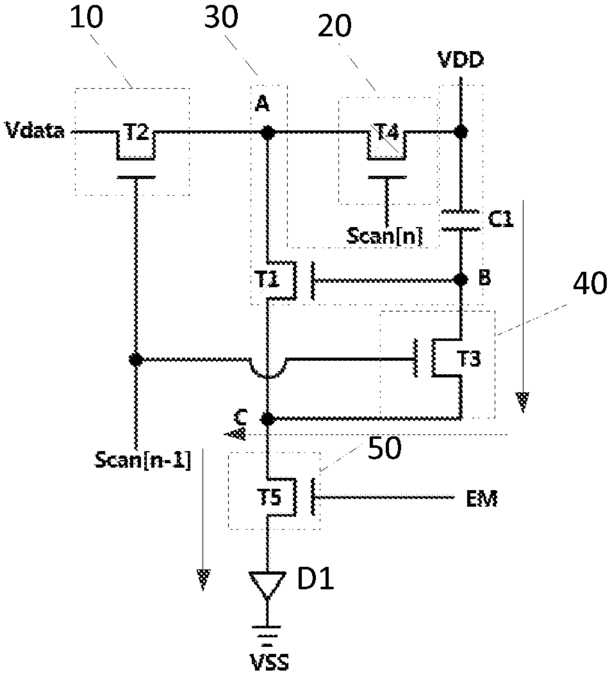
FIG. 8 is a working principle diagram of the pixel driving circuit shown in FIG. 6 in a reset phase.

In a reset phase (t1): Scan[n−1] and EM both output a low level to turn on transistors T2, T3, and T5, Scan[n] outputs a high level to turn off transistor T4, a potential of a gate of transistor T1 charge to an anode of the OLED by T3 and T5. At this time, T3 and T5 are in a linear region, and a current passing through the anode of the light-emitting device is relatively large, so the gate potential of the driving transistor T1 (point B potential) is instantly pulled down. A potential written to the gate of T1 in the previous frame is Vdata+Vth, and a potential at point A is Vdata. At this time, a voltage difference between the gate and source of T1 is Vgs=Vdata+Vth−Vdata=Vth, T1 is in off state, and point A does not affect the gate reset of the driving transistor. The working principle of the circuit is shown in FIG. 8 below; the arrows in FIG. 8 to FIG. 10 indicate a direction of current flow.

Figure 9:
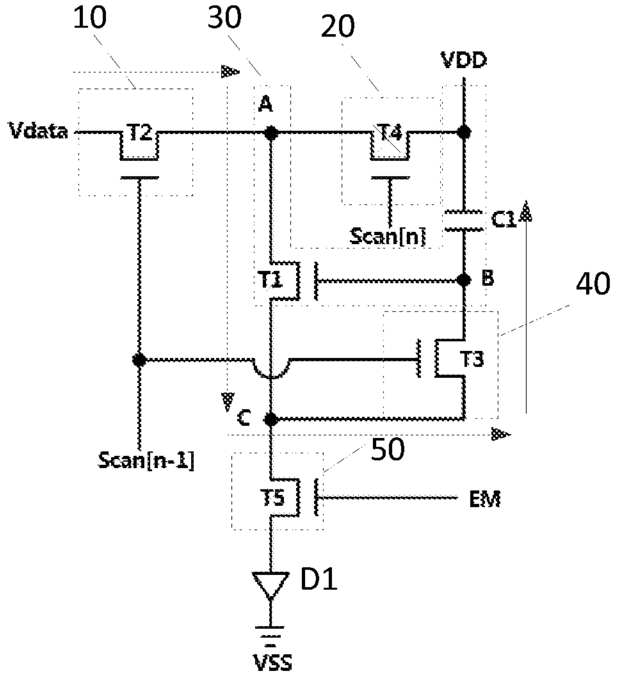
FIG. 9 is a working principle diagram of the pixel driving circuit shown in FIG. 6 in a compensation phase.
Figure 10:
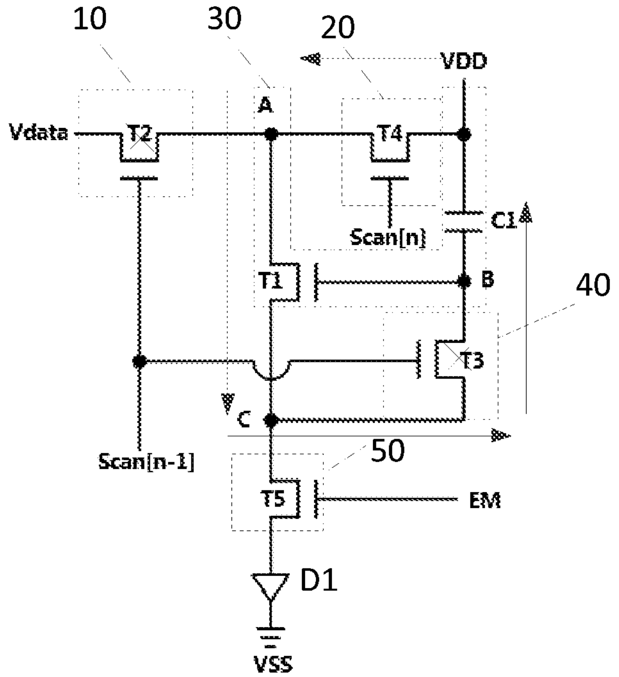
FIG. 10 is a working principle diagram of the pixel driving circuit shown in FIG. 6 in a light-emitting phase.

In a threshold voltage compensation phase (t2): Scan[n−1] outputs the low level to turn on the transistors T2 and T3, and Scan[n] outputs the high level to turn off T4. EM outputs the high level to turn off T5, and the data voltage Vdata charges point B by T2, T1, and T3. T1 turns off and the threshold voltage compensation phase ends when the potential at point B meets VA−Vdata=Vth. At this time, the potential at point B is Vdata+Vth, that is, the gate potential of the driving transistor T1 is Vdata+Vth. The working principle of the circuit is shown in FIG. 9;

In a light-emitting phase (t3): Scan[n−1] outputs the high level to turn off transistors T2 and T3, Scan[n] outputs the low level to turn on T4, EM outputs the low level to turn on T5, the first power supply voltage VDD charges the anode of the light-emitting device by T4, T1, and T5, and the saturation current flowing through the driving transistor T1 is as follows, that is, the current I flowing through the anode of the OLED is as follows:

$$I - \frac{1}{2}uC\frac{W}{L}(Vgs - Vth)^2 - \frac{1}{2}uC\frac{W}{L}(Vdata + Vth - VDD - Vth)^2 - \frac{1}{2}uC\frac{W}{L}(Vdata - VDD)^2$$

that is, the current flowing through the anode of the light-emitting device is independent of the threshold voltage of T1, and achieves compensation of the threshold voltage of the driving transistor (to ensure that T1 is turned on, the condition Vdata+Vth−VDD<Vth, that is, Vdata<VDD must be met), and the circuit working principle is shown in FIG. 10. Since there is a relatively fewer number of transistors and the input voltage signals in the pixel driving circuit of this embodiment, the layout area is relatively small, thereby saving wiring space and improving resolution.

The present disclosure also provides a pixel driving method, which is implemented based on any one of the above-mentioned pixel driving circuits, and the pixel driving method includes following steps:

S11, in a reset phase, writing a data voltage Vdata to a first node A in response to control of a first scan signal Scan[n−1] by a data writing unit 10; and pulling down a voltage of a second node B by a compensation unit 40 and a light-emitting control unit 50;

S12, in a compensation phase, charging a voltage of the second node B to a first compensation voltage V1 in response to control of the first scan signal Scan[n−1] by both the data writing unit 10 and the compensation unit 40;

wherein V1=Vdata+Vth, V1 represents the first compensation voltage, Vdata represents the data voltage, and Vth represents a threshold voltage of a driving transistor;

S13, in a light-emitting phase, inputting a first power supply voltage VDD to the first node A in response to control of a second scan signal Scan[n] by a first control unit 20; wherein the driving unit 30 outputs a driving current to a light-emitting device D1 through the light-emitting control unit 50 in response to control of the voltage of the second node B to drive the light-emitting device D1 emitting light.

For the specific description of the above steps and the specific description of the pixel driving circuit, please refer to the corresponding content in any of the foregoing embodiments, which will not be described in detail here.

The present disclosure also provides a display panel including any one of the above-mentioned pixel driving circuits. The display panel may be an organic light-emitting diode display panel.

The present disclosure also provides a display device including any one of the above-mentioned display panels.

The pixel driving circuit, the driving method thereof, and the display device of the present disclosure improve the currently pixel driving circuit, so that the current flowing through the light-emitting device is independent of the threshold voltage of the driving transistor, achieving compensation of the threshold voltage of the driving transistor to prevent uneven display, and thereby improving the display effect.

In summary, although the present disclosure has been disclosed as preferred embodiments above, the above preferred embodiments are not intended to limit the present disclosure. Those of ordinary skill in the art can make various changes and retouching without departing from the spirit and scope of the present disclosure. Therefore, the protection scope of the present disclosure is subject to the scope defined by the claims.

What is claimed is:

1. A pixel driving method based on a pixel driving circuit, wherein the pixel driving method comprises:

in a reset phase, writing a data voltage to a first node in response to control of a first scan signal by a data writing unit, and pulling down a voltage of a second node by a compensation unit and a light-emitting control unit;

in a compensation phase, charging the voltage of the second node to a first compensation voltage in response to the control of the first scan signal by both the data writing unit and the compensation unit;

wherein V1=Vdata+Vth, V1 represents the first compensation voltage, Vdata represents the data voltage, and Vth represents a threshold voltage of a driving transistor; and in a light-emitting phase, inputting a first power supply voltage to the first node in response to control of a second scan signal by a first control unit;

wherein a driving unit outputs a driving current to a light-emitting device through the light-emitting control unit in response to control of the voltage of the second node to drive the light-emitting device to emit light; and wherein the pixel driving circuit comprises:

the data writing unit connected to the data voltage and the first scan signal and configured to write the data voltage to the first node in the reset phase;

the first control unit connected to the first power supply voltage and the second scan signal, coupled to the first node with the driving unit and the data writing unit respectively, and configured to write the first power supply voltage to the first node during the light-emitting phase;

the driving unit connected to the first power supply voltage and configured to provide the driving current;

the compensation unit coupled to the second node with the driving unit, and connected to the first scan signal, wherein the data writing unit and the compensation unit are configured to charge the second node to the first compensation voltage during the compensation phase;

the light-emitting control unit configured to receive a light-emitting signal, coupled to a third node with the driving unit and the compensation unit, and configured to reset the light-emitting device and to control the driving current to transmit to the light-emitting device during the light-emitting phase; and the light-emitting device, wherein a first electrode of the light-emitting device is connected to the light-emitting control unit, and a second electrode of the light-emitting device is configured to receive a second power supply voltage.

2. The pixel driving method as claimed in claim 1, wherein the first control unit comprises a fourth transistor, a gate of the fourth transistor is connected to the second scan signal, a drain of the fourth transistor is connected to the first node, and a source of the fourth transistor is connected to the first power supply voltage.

3. The pixel driving method as claimed in claim 2, wherein the driving unit comprises:

the driving transistor, wherein a gate of the driving transistor is connected to the second node, and a source of the driving transistor is respectively connected to the first node and the drain of the fourth transistor; and a first capacitor, wherein one terminal of the first capacitor is connected to the first power supply voltage, and another terminal of the first capacitor is connected to the second node.

4. The pixel driving method as claimed in claim 3, wherein the compensation unit comprises a third transistor, a gate of the third transistor is configured to receive the first scan signal, a source of the third transistor and a gate of the driving transistor are connected to another terminal of the first capacitor, and a drain of the third transistor is connected to the third node.

* * * * *